United States Patent [19]
Davidson

[11] Patent Number: 6,016,048
[45] Date of Patent: Jan. 18, 2000

[54] TEMPERATURE COMPENSATED BATTERY CHARGER SYSTEM

[75] Inventor: Chris R. Davidson, Grove, Okla.

[73] Assignee: Eagle-Picher Industries, Inc., Cincinnati, Ohio

[21] Appl. No.: 09/109,961

[22] Filed: Jul. 2, 1998

Related U.S. Application Data

[60] Provisional application No. 60/051,543, Jul. 2, 1997.

[51] Int. Cl.[7] .......................... H01M 10/44; H01M 10/46
[52] U.S. Cl. ............................................................ 320/153
[58] Field of Search .................................... 320/137, 144, 320/150, 153, FOR 134, FOR 142

[56] References Cited

U.S. PATENT DOCUMENTS

| | | |
|---|---|---|
| 3,597,673 | 8/1971 | Burkett et al. . |
| 3,603,862 | 9/1971 | Chase et al. . |
| 3,609,505 | 9/1971 | Harland, Jr. et al. . |
| 3,626,270 | 12/1971 | Burkett et al. . |
| 4,051,420 | 9/1977 | Tanikoshi ................................ 318/254 |
| 4,316,133 | 2/1982 | Locke, Jr. . |
| 4,322,685 | 3/1982 | Frailing et al. ........................ 324/429 |
| 4,370,606 | 1/1983 | Kakumoto et al. . |
| 4,395,139 | 7/1983 | Namiki et al. ........................ 374/178 |
| 4,470,003 | 9/1984 | Mitchell ................................... 322/23 |
| 4,588,940 | 5/1986 | Embree et al. ........................ 323/313 |
| 4,663,580 | 5/1987 | Wortman . |
| 4,686,443 | 8/1987 | Steblay . |
| 4,816,737 | 3/1989 | Delmas et al. . |
| 4,843,302 | 6/1989 | Dobkin et al. ........................ 323/312 |
| 4,992,772 | 2/1991 | Kubota et al. ........................ 338/308 |
| 5,095,260 | 3/1992 | Whiting . |
| 5,237,481 | 8/1993 | Soo et al. .............................. 361/103 |
| 5,245,271 | 9/1993 | Simmons ................................ 322/60 |
| 5,289,103 | 2/1994 | Eccleston . |
| 5,563,495 | 10/1996 | Tomiyori et al. . |
| 5,572,416 | 11/1996 | Jacobs et al. ............................. 363/89 |
| 5,623,195 | 4/1997 | Bullock et al. . |
| 5,640,079 | 6/1997 | Nelson et al. . |

OTHER PUBLICATIONS

Robert A. Pease, A New Production Technique for Trimming Voltage Regulators, National Semiconductor Linear Brief 46, pp. 1164–1165. No Date.

IN4001 through IN4007, Motorola Semiconductor Data Library, vol. 1, Motorola Technical Information Center 1974, pp. 1–85 through 1–88.

Mohammed S. Ghausi, Terminal Characteristics of Junction Diodes, Electronic Devices and Circuits Discrete and Integrated, HRW College Publishing 1985, pp. 2–5.

Glenn M. Glasford, Semiconductors Junctions, and the Junction Diode, Analog Electronic Circuits, Prentice–Hall 1986, pp. 38–41.

Jacob Millman and Arvin Grabel, The Diode as a Circuit Element, Microelectronics 2nd Edition, McGraw–Hill 1987, p. 49.

*Primary Examiner*—Edward H. Tso
*Attorney, Agent, or Firm*—Wood, Herron & Evans L.L.P.

[57] ABSTRACT

A battery charger system for providing a temperature compensated charging output voltage to a battery. The battery charger system includes a voltage source and an output circuit coupled to the voltage source and the battery for supplying the charging output voltage to the battery. The output circuit includes a diode compensation network that is responsive to variations in temperature near the battery to vary the charging output voltage supplied to the battery. Methods for providing a temperature compensated charging output voltage to a battery are also disclosed.

23 Claims, 1 Drawing Sheet

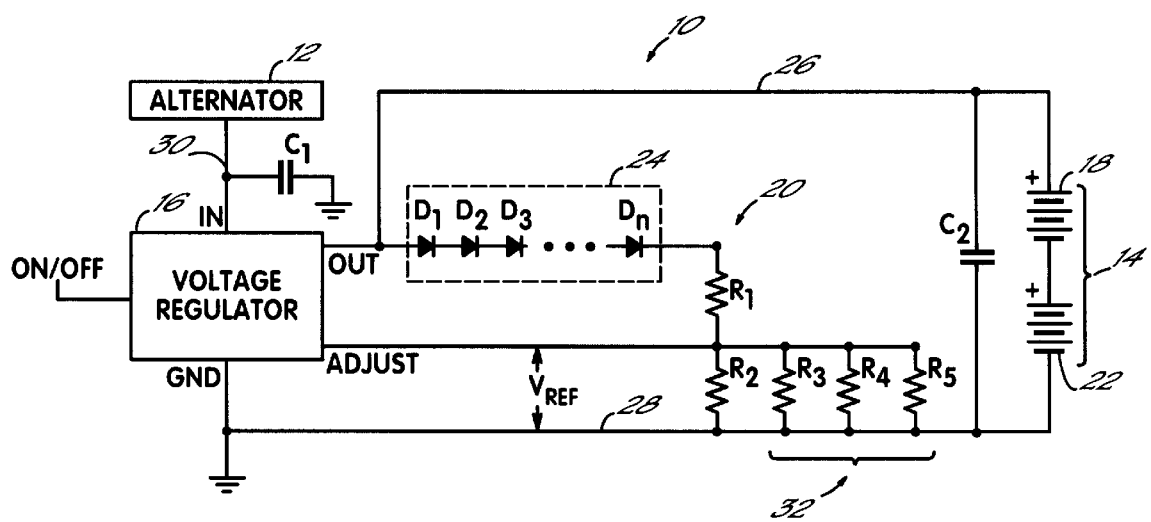

TEMPERATURE COMPENSATED BATTERY CHARGER SYSTEM

CROSS REFERENCE TO RELATED APPLICATIONS

The present application is a continuation of provisional application Ser. No. 60/051,543, filed Jul. 2, 1997, which is hereby incorporated herein by reference in its entirety.

FIELD OF THE INVENTION

The present invention relates generally to battery chargers and, more particularly, to battery charger systems that are adapted to provide a temperature compensated charger output voltage to a lead acid battery.

BACKGROUND OF THE INVENTION

In many applications it is desirable to supply a charging voltage to a lead acid battery. However, as lead acid batteries have a distinct negative temperature characteristic, a battery charger designed to adequately charge a lead acid battery at normal temperature may severely overcharge a battery at higher temperatures or drastically undercharge a battery at lower temperatures. For this reason, battery chargers have been designed that automatically adjust the charger output voltage for temperature variations. The charger is designed to supply a higher charging voltage to the battery at lower temperatures and, conversely, a lower charging voltage at higher temperatures.

However, battery chargers have provided automatic temperature compensation of charger output voltage in the past through the use of thermistor/resistor networks, temperature sensitive resistors or special purpose integrated circuit chargers. While these solutions have aided in reducing the possibility of over or under charging lead acid batteries due to temperature variations in the approximate area of the battery, they are costly and complicated.

Thus, there is a need for a battery charger system that supplies an accurate and predictable charger output voltage to a battery with automatic temperature compensation adjustment of the output voltage. There is also a need for a battery charger system that automatically adjusts the charger output voltage supplied to the battery in an efficient and low cost manner.

SUMMARY OF THE INVENTION

The present invention overcomes the foregoing and other shortcomings and drawbacks of the battery charger systems and methods heretofore known. While the invention will be described in connection with certain embodiments, it will be understood that the invention is not limited to these embodiments. On the contrary, the invention includes all alternatives, modifications and equivalents as may be included within the spirit and scope of the present invention.

The present invention is directed to a battery charger system for supplying a temperature compensated charging output voltage to a lead acid battery. The battery charger system includes a regulated voltage source and an output circuit coupled to the voltage source and the battery for supplying the charging output voltage to the battery. The output circuit uses a diode compensation network formed as a string of series connected diodes to automatically adjust the charger output voltage for temperature variations in the vicinity of the battery.

More particularly, each standard silicon diode junction in the diode compensation network will exhibit a normal forward voltage temperature coefficient of about −1.8 to about −2.2 mV/°C. when driven by a small current. The number of diodes provided in the diode compensation network is particularly chosen to match the charging curve of the battery being charged. Thus, as temperature variations occur in the vicinity of the battery being charged, the temperature coefficient of the diode compensation network will automatically adjust the charger output voltage to match the charging curve of the battery being charged.

The above and other objects and advantages of the present invention shall be made apparent from the accompanying drawing and the description thereof.

BRIEF DESCRIPTION OF THE DRAWING

The accompanying FIGURE, which is incorporated in and constitutes a part of this specification, illustrates an embodiment of the invention and, together with a general description of the invention given above, and the detailed description of the embodiment given below, serves to explain the principles of the invention.

The FIGURE illustrates a functional block diagram of a temperature compensated battery charger system in accordance with the principles of the present invention.

DETAILED DESCRIPTION OF THE INVENTION

With reference to the FIGURE, a temperature compensated battery charger system 10 is shown in accordance with the principles of the present invention. As will be described in greater detail below, battery charger system 10 is adapted to receive an unregulated voltage from alternator 12, and supply a regulated charging output voltage to battery 14 that is automatically adjusted to compensate for temperature variations in the approximate environment of battery 14. Battery charging system 10 operates to lower the charging output voltage supplied to battery 14 at higher temperatures to prevent overcharging of battery 14, while a higher charging output voltage is supplied to battery 14 at lower temperatures to prevent undercharging of the battery 14. Temperature compensation of the charging output voltage may be readily adjusted in the battery charger system 10 to substantially match the charging curve of the particular battery being charged.

As shown in the FIG., battery charger system 10 includes a voltage regulator 16 that is coupled to positive terminal 18 of battery 14 through an output circuit 20. The negative terminal 22 of battery 14 is connected to ground. Battery 14 may be a six (6) cell lead acid battery that is found in typical automotive applications, but those skilled in the art will readily appreciate that the battery charger system 10 of the present invention is adapted to operate with other types of batteries and in other applications as well. Output circuit 20 includes series connected resistor $R_1$, resistor $R_2$ and diode compensation network 24 that are collectively coupled in parallel with battery 14. Output circuit 20 includes output line 26 coupled to the positive terminal 18 of battery 14 and ground line 28 coupled to the negative terminal 22. As those skilled in the art will readily appreciate, the output charger voltage supplied by battery charger system 10 to battery 14 is the sum of the voltages that are dropped across resistor $R_1$, resistor $R_2$ and diode compensation network 24. A capacitor $C_2$ may be connected in parallel with output circuit 20 to maintain regulation of the output charger voltage supplied by battery charger system 10 during transients.

As will be described in greater detail below, the diode compensation network 24 includes a string of diodes $D_1$ through $D_n$ that are used to provide temperature compensation of the charger output voltage supplied to battery 14. As each standard silicon diode p-n junction will exhibit a normal forward voltage temperature coefficient of about −1.8 to about −2.2 mV/°C. when driven by a small current, the number of diodes provided in diode compensation network 24 is particularly chosen to match the charging curve of battery 14. As those of ordinary skill in the art will appreciate, two diodes at −2 mV/°C. will approximate the −4 mV/°C. requirements of a standard lead acid battery cell.

Voltage regulator 16 includes an "IN" pin that receives an unregulated input voltage from alternator 12 that may vary in a range between about 14.20 V and about 15.60 V via input line 30. A capacitor $C_1$ may be coupled to input line 30 to filter the input voltage supplied by alternator 12 as is conventional in the art. Voltage regulator 16 may be an LM2941 T adjustable voltage regulator that is commercially available from National Semiconductor, Inc., although other fixed and adjustable voltage regulators are possible without departing from the spirit and scope of the present invention.

Upon receiving the input voltage from alternator 12 via line 30, voltage regulator 16 operates to develop a stable reference voltage $V_{REF}$ of about 1.275 V between the "ADJUST" and 20 "GND" pins of the voltage regulator 16, although other reference voltages are possible. The reference voltage $V_{REF}$ is impressed across resistor $R_2$ to develop a constant current that flows through the output circuit 20 to the "OUT" pin of voltage regulator 16. Resistor $R_2$ may be selected to have a value of 1 KΩ to develop a constant current of 1.275 mA that flows through output circuit 20, although the current may vary in a range between about 1 mA and about 10 mA. The value of resistor $R_1$ is selected to have a value that will allow the output circuit 20 to supply the desired output charge voltage to battery 14 at about 25° C.

As stated above, the number of diodes provided in diode compensation network 24 is particularly chosen to match the charge curve of the particular battery being charged. For example, a six (6) cell lead acid battery that requires a temperature compensation of about −20 mV/°C. to the output charger voltage will require approximately ten (10) series connected diodes in the diode compensation network 24 to provide the required −20 mV/°C. temperature coefficient. The voltage drop across the diode compensation network 24 will be about 5.75 V (10 diodes×0.575 V/diode), and the voltage drop across $R_2$ will be $V_{REF}$, or about 1.275 V. If the desired output charge voltage of battery charger system 10 is 14.10 V at about 25° C., the value of resistor $R_1$ must be selected to be about 5.49 KΩ to provide a voltage drop of about 7.0 V across resistor $R_1$. Diodes $D_1$ through $D_n$ should be placed approximately in the same environment as the battery to be charged to provide an accurate temperature compensation of the charger output voltage. It will be readily appreciated by those skilled in the art that the diode compensation network 24 will automatically compensate the charger output voltage supplied to battery 14 by the temperature coefficient of the series connected diode string $D_1$ through $D_n$.

As illustrated in the FIG., output circuit 20 may include a trim circuit 32 coupled to resistor $R_2$ to permit trimming of resistor $R_2$'s value to adjust the final charger output voltage supplied to battery 14. Trim circuit 32 may include a parallel array of resistors $R_3$, $R_4$ and $R_5$ that are connected in parallel with resistor $R_2$. Resistors $R_3$, $R_4$ and $R_5$ may form a binary weighted parallel resistor array with resistance values of about 20 KΩ, 39 KΩ, and 91 KΩ, respectively. In operation, if the desired charger output voltage is 14.10 V and the measured output voltage is higher than 14.45 V, resistor $R_3$ is first cut out of the circuit. If the resulting charger output voltage is now higher than 14.28 V, resistor $R_4$ is cut out of the circuit. If the resulting charger output voltage is now higher than 14.18 V, resistor $R_5$ is cut out of the circuit to complete trimming of resistor $R_2$'s value to adjust the final charger output voltage to the desired value.

Those skilled in the art will appreciate that the battery charger system 10 of the present invention provides accurate and predictable temperature compensation to the charger output voltage supplied to battery 14. The diode compensation network 24 incorporated into battery charger system 10 provides an efficient and low cost solution to temperature compensation of the charger output voltage supplied to battery 14.

While the present invention has been illustrated by a description of one embodiment and while that embodiment has been described in considerable detail, it is not the intention of applicant to restrict or in any way limit the scope of the appended claims to such detail. For example, while not shown, it will be appreciated by those skilled in the art that battery charger system 10 may include activation circuitry that operates to disconnect charger system 10 from battery 14 upon certain conditions. The activation circuitry may also operate to turn the voltage regulator 16 on and off through a signal provided to the "ON/OFF" pin of the voltage regulator 16. Cell drop-out circuitry may be provided to indicate that one or more cells of battery 14 have dropped out. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A temperature compensated battery charger system for charging a battery, comprising:
   a voltage source;
   an output circuit coupled to said voltage source and adapted to be coupled to said battery for supplying a charging output voltage to said battery; and
   at least two diodes coupled in series in said output circuit wherein said diodes are responsive to variations in temperature proximate said battery to vary said charging output voltage supplied to said battery.

2. The battery charger system of claim 1 further comprising a trim circuit coupled to said output circuit.

3. The battery charger system of claim 2 wherein said trim circuit comprises a parallel resistor array.

4. The battery charger system of claim 3 wherein said parallel resistor array is binary weighted.

5. The battery charger system of claim 1 wherein said output circuit includes at least one resistive element coupled in series with said diodes.

6. The battery charger system of claim 5 wherein said series connected resistive element and diodes are collectively adapted to be connected in parallel with said battery.

7. The battery charger system of claim 1 wherein said diodes are adapted to be disposed proximate said battery.

8. The battery charger system of claim 1 wherein said voltage source comprises a regulated voltage source.

9. A temperature compensated battery charger system for charging a battery, comprising:
   a voltage source;
   an output circuit coupled to said voltage source and adapted to be coupled to said battery for supplying a charging output voltage to said battery;

first and second resistive elements coupled in series in said output circuit; and at least two diodes coupled in series with said first and second resistive elements in said output circuit wherein said diodes are responsive to variations in temperature proximate said battery to vary said charging output voltage supplied to said battery.

10. The battery charger system of claim 9 wherein said charging output voltage is defined by a combined voltage drop across the first and second resistive elements and said diodes.

11. The battery charger of claim 9 further comprising a trim circuit coupled to one of said first and second resistive elements.

12. The battery charger system of claim 11 wherein said trim circuit comprises a parallel resistor array.

13. The battery charger system of claim 9 wherein said output circuit is adapted to be connected in parallel with said battery.

14. The battery charger system of claim 1 wherein said voltage source comprises a regulated voltage source.

15. A temperature compensated battery charger system for charging a battery, comprising:

a regulated voltage source; and at least two diodes coupled to said regulated voltage source and adapted to be coupled to said battery for supplying a charging output voltage to said battery, wherein said diodes are responsive to variations in temperature proximate said battery to vary said charging output voltage supplied to said battery.

16. The battery charger system of claim 15 further comprising a resistive element coupled in series to said diodes.

17. The battery charger system of claim 16 wherein said resistive element and said diodes are collectively adapted to be connected in parallel with said battery.

18. A method of providing a temperature compensated charging output voltage to a battery, comprising:

providing a regulated voltage source;

providing at least two series connected diodes coupled to said regulated voltage source for supplying a charging output voltage to said battery; and coupling said diodes in parallel to said battery, wherein said diodes are responsive to variations in temperature proximate said battery to vary said charging output voltage supplied to said battery.

19. The method of claim 18 further comprising the step of coupling at least one resistive element in series with said diodes.

20. The method of claim 19 further comprising the step of collectively coupling said series connected resistive element and diodes in parallel with said battery.

21. A temperature compensated battery charger system for charging a battery, comprising:

a voltage source;

an output circuit coupled to said voltage source and adapted to be coupled to said battery for supplying a charging output voltage to said battery;

at least one resistive element in said output circuit; and at least two diodes coupled in series with said resistive element in said output circuit, wherein said series connected resistive element and diodes are collectively adapted to be connected in parallel with said battery, and further wherein said diodes are responsive to variations in temperature proximate said battery to vary said charging output voltage supplied to said battery.

22. A temperature compensated battery charger system for charging a battery, comprising:

a regulated voltage source;

an output circuit coupled to said regulated voltage source and adapted to be coupled to said battery for supplying a charging output voltage to said battery;

at least two diodes coupled to in said output circuit; and a resistive element coupled in series with said diodes in said output circuit, wherein said resistive element and said diodes are collectively adapted to be connected in parallel with said battery, and further wherein said diodes are responsive to variations in temperature proximate said battery to vary said charging output voltage supplied to said battery.

23. A method of providing a temperature compensated charging output voltage to a battery, comprising:

providing a regulated voltage source;

coupling at least two series connected diodes to said regulated voltage source;

coupling at least one resistive element in series with said diodes; and collectively coupling said series connected resistive element and diodes in parallel with said battery for supplying a charging output voltage to said battery, wherein said diodes are responsive to variations in temperature proximate said battery to vary said charging output voltage supplied to said battery.

* * * * *

UNITED STATES PATENT AND TRADEMARK OFFICE
CERTIFICATE OF CORRECTION

PATENT NO. : 6,016,048

DATED : January 18, 2000

INVENTOR(S) : Chris R. Davidson

It is certified that error appears in the above-identified patent and that said Letters Patent is hereby corrected as shown below:

In The Claims

Claim 22, line 7 after "diodes coupled" delete "to".

This is the first correction.

Signed and Sealed this

Third Day of April, 2001

Attest:

NICHOLAS P. GODICI

Attesting Officer

Acting Director of the United States Patent and Trademark Office